United States Patent

[11] 3,627,752

[72] Inventors Dieter Cornelius
 47 Hebbelstrasse, 61 Darmstadt-Arheilgen;
 Hanswilli von Brachel, 11
 Gutenbergstrasse, 605 Offenbach/Main;
 Heinz Bender, Kirchgasse, 6 Bergen-
 Enkheim, all of Germany
[21] Appl. No. 791,773
[22] Filed Jan. 16, 1969
[45] Patented Dec. 14, 1971
[73] Assignee Cassella Farbwerke Mainkur
 Aktiengesellschaft
 Frankfurt am Main Germany
[32] Priority Jan. 19, 1968
[33] Germany
[31] P 17 19 066.8

[54] WATER-INSOLUBLE MONOAZO DYESTUFFS
 3 Claims, No Drawings
[52] U.S. Cl. ..................................... 260/205,
 260/196, 260/206, 260/207, 260/207.1,
 260/207.5, 260/465 E
[51] Int. Cl. .................................... C07c 107/06,
 C07c 107/08, C09b 29/06

[50] Field of Search............................................. 260/207.1,
 207, 206, 205, 207.5, 196

[56] References Cited
FOREIGN PATENTS
1,511,932 12/1967 France ......................... 260/207.1
1,511,933 12/1967 France ......................... 260/207.1

Primary Examiner—Charles B. Parker
Assistant Examiner—Charles F. Warren
Attorney—Connolly and Hutz ABSTRACT: Water-insoluble monoazo dyestuffs of the formula:

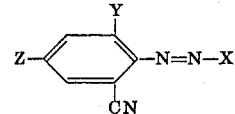

wherein Y is alkylsulfonyl of one to two carbon atoms or nitro, Z is alkylsulfonyl of one to two carbon atoms or cyano, at least one of Y and Z being said alkylsulfonyl group, and X is the residue of a coupling component free from water-solubilizing groups, said dyestuffs being particularly useful for dyeing and printing synthetic fibers.

WATER-INSOLUBLE MONOAZO DYESTUFFS

The water-insoluble monoazo dyestuffs of the present invention are of the formula:

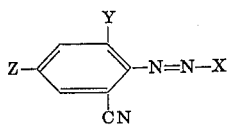

wherein Y is alkylsulfonyl of one to two carbon atoms or nitro, Z is alkylsulfonyl of one to two carbon atoms or cyano, at least one of Z and Z being said alkylsulfonyl group, and X is the residue of a coupling component free from water-solubilizing groups. X may be any one of the aforesaid residues, these being generally classified as residues of aromatic hydroxy compounds, aromatic amines, substances containing reactive methylene groups, phenol and naphthol ethers and hydrocarbons. Preferred coupling components free from water-solubilizing groups are described in "The Chemistry of Synthetic Dyes and Pigments" edited by H. A. Lubs, Reinhold Publishing Corporation, New York (1955). See Chapter 4 in particular, including table I beginning at page 184.

A preferred class coupling components of the present invention embraces tertiary anilines, tertiary α-naphthylamines and mono-tertiary-m-phenylenediamines. Particularly preferred coupling components are of the formula:

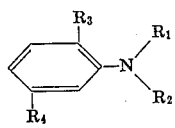

wherein $R_1$ and $R_2$ are alkyl, hydroxyalkyl, acetoxyalkyl, cyanoalkyl, alkoxycarbonylalkyl, carbamoyloxyalkyl or alkylsulfonylalkyl having one to six carbon atoms or phenyl; $R_3$ is hydrogen or alkyl or alkoxy having one to two carbon atoms and $R_4$ is hydrogen or $-NH-R_5$ wherein $R_5$ is an aliphatic acyl group. Preferred $R_5$ moieties embrace alkanoyl having up to six carbon atoms or said alkanoyl substituted with halo, alkoxy having up to four carbon atoms, cyano, hydroxy, acetoxy or phenoxy. The preferred halogen substituents of the aforesaid coupling components are chlorine and bromine.

Dyestuffs of the present invention may be obtained in known manner. Thus, they are obtained by diazotizing, according to the usual techniques, amines of the formula:

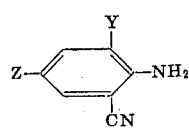

and subsequently coupling with coupling components free from water-solubilizing groups of the general formula HX. As pointed out above, X may be the reside of any coupling component free from water-solubilizing groups, the most preferred residue being of the formula:

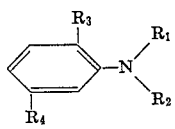

Dyestuffs of the present invention may also be obtained by the procedure described in U.S. Pat. application Ser. No. 640,839 filed May 24, 1967 and now abandoned. In accordance with that procedure a dyestuff, which has a halogen substituent in the position where the final dyestuff contains a cyano substituent, is reacted with cuprous cyanide or a mixture of a cuprous compound and an alkali metal or an alkaline earth metal cyanide in a reaction inert organic solvent in order to replace the halogen substituent with the desired cyano substituent.

The dyes of the present invention are particularly suited for the dyeing and printing of articles made from hydrophobic synthetic materials, such as those made from cellulose acetate of cellulose triacetate, and especially polyester materials based on polyethylene glycol terephthalate. When applied to these materials, they yield, according to the usual dyeing and printing processes, deep dyes and full prints having very good fastness properties. In particular, they have excellent fastness to light and sublimation.

Printing of the above-mentioned materials can be carried out in such a manner that the materials printed with the dyes of the present invention are steamed in the presence of a carrier at temperatures from about 95° to 110° C. or, in the absence of a carrier, at approximately 120° to 140° C. or are treated according to the so-called thermofixing process. Dyeing of said materials with the dyes of the present invention is advantageously performed from an aqueous suspension in the presence of carriers at temperatures of between about 80° and 110° C., in the absence of carriers at temperatures ranging from about 110° to 140° C. or according to the so-called thermofixing process.

The following examples are for the purpose of illustrating preferred embodiments of the present invention. Unless otherwise stated, all temperatures are in degrees Centigrade and all parts and percentages are by weight.

EXAMPLE 1

25.5 g. 2-cyano-4-ethylsulfonyl-6-nitraniline was added with stirring at 15°–20° to 107 g. nitrosyl-sulfuric acid (prepared from 7 g. sodium nitrite and 100 g. sulfuric acid). At approximately 10°, the solution was admixed with 100 g. glacial acetic acid and, at about 0°, 100 g. ice was added. Subsequently, this reaction mixture was stirred for half an hour. The diazo solution thus obtained was allowed to run into a solution of 20.7 g. N-ethyl-N-acetoxyethyl-aniline dissolved in 200 cc. of 10 percent sulfuric acid to which 100 g. ice had been added. The reaction being terminated, the reaction mixture was diluted with water and the separated dyestuff was filtered off with suction and washed with water until neutral. The resulting dyestuff, in finely dispersed form, dyed polyester fibers to red violet shades.

The following table enumerates further dyestuffs of the present invention. These are obtained by reacting the diazo solution of 2-cyano-4-methylsulfonyl-6-nitroaniline prepared according to the method described in the previous paragraph with the given coupling component. Polyester materials are dyed to the indicated shades.

| Coupling Component | Shade on Polyester |
|---|---|
| N-ethyl-N-cyanoethyl-m-toluidine | violet |
| N,N-diacetoxyethyl-aniline | purplish red |
| N-hydroxyethyl-N-cyanoethyl-aniline | violet |
| N,N-diethyl-N'-methoxyacetyl-m-phenylenediamine | blue violet |
| N,N-dimethyl-N'-acetoxyacetyl-m-phenylenediamine | blue violet |
| N,N-diethyl-α-naphthylamine | blue |
| N,N-diethyl-N'-butyryl-m-phenylenediamine | blue |
| N,N-dimethyl-N'-butoxyacetyl-m-phenylenediamine | blue violet |
| N-ethyl-N-cyanoethyl-N'-cyanoacetyl-m-phenylenediamine | violet |
| N,N-diethyl-N'-hydroxyacetyl-m-phenylenediamine | blue |

N,N-diethyl-N'-phenoxyacetyl-m-phenylenediamine            blue violet

EXAMPLE 2

22.1 g. 2,4-dicyano-6-methylsulfonyl-aniline was added with stirring at 15°–20° to 107 g. nitrosyl-sulfuric acid (prepared from 7 g. sodium nitrite and 100 g. sulfuric acid). At about 10°, the solution was admixed with 100 g. glacial acetic acid and at approximately 0°, 100 g. ice was added. Subsequently this reaction mixture was stirred for half an hour. The diazo solution thus obtained was allowed to run into a solution of 20.6 g. N,N-diethyl-N'-acetyl-m-phenylenediamine dissolved in 200 cc. of 10 percent aqueous sulfuric acid to which 100 g. ice had been added. The reaction mixture was diluted with water and the dyestuff thus precipitated was filtered off with suction and washed with water until neutral. The dyestuff which was obtained, in finely dispersed form, dyes polyester fibers blue violet shades.

The dyestuff of the preceding paragraph is also obtained if 49.2 g. 2-bromo-4-cyano-6-methylsulfonyl-1-[4'-diethylamino-2'-acetylamino-phenylazo]-benzene dissolved in 100 g. pyridine is heated with 9 g. cuprous cyanide and 1 g. sodium cyanide to 100°. When cooling down, the dyestuff thus prepared is precipitated by adding dropwise 100 g. of a 10 percent sodium cyanide solution. It is then filtered off with suction and washed until neutral.

The following table enumerates a further series of dyestuffs of the present invention, which are obtained by reacting the diazo solution prepared according to the first paragraph of this example with the given coupling component. These dye polyester materials to the given shades.

| Coupling Component | Shade on Polyester |
| --- | --- |
| N-ethyl-N-hydroxyethylaniline | violet |
| N-phenyl-N-methoxycarbonyethylaniline | violet |
| N-ethyl-N-allylaminocarbonyloxy-ethylaniline | violet |
| N,N-diacetoxyethyl-N'-acetyl-m-phenylenediamine | violet |

EXAMPLE 3

27.4 g. 2-cyano-4,6-dimethylsulfonyl-aniline was added with stirring at 15°–20° to 107 g. nitrosyl-sulfuric acid (prepared from 7 g. sodium nitrite and 100 g. sulfuric acid). At approximately 10°, the solution was admixed with 150 g. glacial acetic acid and stirring was continued for 1½ hours. The diazo solution thus obtained was admixed with a solution of 20.6 g. N,N-diethyl-N'-acetyl-phenylenediamine dissolved in 100 g. glacial acetic acid. After termination of the reaction, the dyestuff was precipitated by the addition of ice and isolated as described in the preceding examples. The dyestuff obtained dyed polyester materials blue violet shades.

The dyestuff of the preceding paragraph is also obtained if 54.1 g. 2-bromo-4,6-dimethylsulfonyl-1-[4'-N,N-diethylamino-2'-acetylamino-phenylazo]-benzene dissolved in 150 g. dimethylsulfoxide is heated for half an hour at 100° with 9 g. cuprous cyanide and 1 g. sodium cyanide and worked up as described in the second paragraph of example 2.

The following table enumerates a further series of dyestuffs of the present invention which are obtained by reacting the diazo solution prepared according to the first paragraph of this example with the given coupling component. These dye polyester materials to the given shades.

| Coupling Component | Shade on Polyester |
| --- | --- |
| N,N-diethylaniline | violet |
| N-ethyl-N-cyanoethyl-aniline | red violet |
| N-cyanoethyl-N-acetoxyethyl-aniline | purplish red |
| N,N-diethyl-N'-chloroacetyl-m-phenylenediamine | violet |
| N-ethyl-N-acetoxyethylaniline | red violet |
| N-ethyl-N-methoxycarbonylethyl-aniline | red violet |
| N-ethyl-N-hydroxyethyl-α-naphthylamine | violet |

We claim:
1. A water-insoluble monoazo dyestuff of the formula

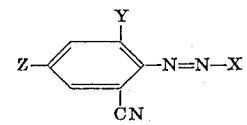

wherein Y is alkylsulfonyl of one to two carbon atoms or nitro, Z is alkylsulfonyl of one to two carbon atoms, and X is the residue of a coupling component selected from the group consisting of N,N-diethyl-α-naphthylamine and N-ethyl-N-hydroxyethyl-α-naphthylamine or X is of the formula

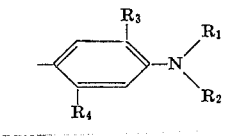

wherein $R_1$ and $R_2$ are alkyl, hydroxyalkyl acetoxyalkyl, cyanoalkyl, alkoxycarbonylalkyl, carbamoyloxyalkyl or alkylsulfonylalkyl having one to six carbon atoms or phenyl; $R_3$ is hydrogen or alkyl or alkoxy having one to two carbon atoms and $R_4$ is hydrogen or $-NH-R_5$ wherein $R_5$ is alkanoyl having up to six carbon atoms or said alkanoyl substituted with chloro, bromo, alkoxy having up to four carbon atoms, cyano, hydroxy, acetoxy or phenoxy.

2. The water-insoluble monoazo dyestuff of claim 1 wherein S is nitro, Z is ethylsulfonyl and X is of said formula wherein $R_1$ is ethyl, $R_2$ is acetoxyethyl and $R_3$ and $R_4$ are each hydrogen.

3. The water-insoluble monoazo dyestuff of claim 1 wherein Y and Z are each methylsulfonyl and X is of said formula wherein $R_1$ and $R_2$ are each ethyl and $R_3$ and $R_4$ are each hydrogen.

* * * * *

PO-1050
(5/69)

UNITED STATES PATENT OFFICE
CERTIFICATE OF CORRECTION

Patent No. 3,627,752       Dated December 14, 1971

Inventor(s) Dieter Cornelius, Hanswilli von Brachel and Heinz Bender

It is certified that error appears in the above-identified patent and that said Letters Patent are hereby corrected as shown below:

Col. 1, line 17, "Z and Z" should read -- Y and Z --.

Col. 4, line 55, "S" should read -- Y --.

Signed and sealed this 30th day of May 1972.

(SEAL)
Attest:

EDWARD M. FLETCHER, JR.
Attesting Officer

ROBERT GOTTSCHALK
Commissioner of Patents